United States Patent [19]

Anson et al.

[11] Patent Number: 5,377,299
[45] Date of Patent: Dec. 27, 1994

[54] WATER HEATING APPARATUS HAVING A THERMAL AND LIQUID LEVEL SENSOR ASSEMBLY

[75] Inventors: James H. Anson; William E. Midden, both of Springfield, Ill.

[73] Assignee: Bunn-O-Matic Corporation, Springfield, Ill.

[21] Appl. No.: 80,551

[22] Filed: Jun. 21, 1993

Related U.S. Application Data

[62] Division of Ser. No. 786,306, Nov. 1, 1991, Pat. No. 5,251,541.

[51] Int. Cl.⁵ .................. H05B 1/02; H05B 3/82; F24H 1/20; A47J 27/21
[52] U.S. Cl. .................. 392/447; 99/281; 219/436; 219/437; 219/438; 219/441; 392/441; 392/451; 392/498
[58] Field of Search .............. 392/441, 442, 444–452, 392/498; 219/437, 436, 438, 441, 442; 99/281

[56] References Cited

U.S. PATENT DOCUMENTS

| | | | |
|---|---|---|---|
| 1,318,168 | 10/1919 | Newsom | 219/441 |
| 1,910,933 | 5/1933 | Santurello | 392/447 |
| 1,920,013 | 7/1933 | Green | 392/447 |
| 1,984,129 | 12/1934 | Green | 392/447 X |
| 1,990,546 | 2/1935 | Hubbard | 99/281 X |
| 2,903,551 | 9/1959 | Fischer | 392/451 |
| 3,487,200 | 12/1969 | Waller et al. | 219/441 X |
| 3,678,246 | 7/1972 | Blachly et al. | 219/441 X |
| 3,715,567 | 2/1973 | Mandziak | 99/281 X |
| 3,870,858 | 3/1975 | Schimke | 392/447 |
| 4,676,148 | 6/1987 | Foley | |
| 4,730,099 | 3/1988 | Bleckman | 392/447 |
| 4,978,833 | 12/1990 | Knepler | |

FOREIGN PATENT DOCUMENTS

| | | | |
|---|---|---|---|
| 163391 | 6/1955 | Australia | 219/441 |
| 1267301 | 6/1961 | France | 392/498 |
| 1108827 | 6/1961 | Germany | 392/451 |
| 518320 | 3/1953 | Netherlands | 219/438 |
| 699245 | 11/1953 | United Kingdom | 392/498 |
| 1018818 | 2/1966 | United Kingdom | 219/437 |
| 1027253 | 4/1966 | United Kingdom | 392/451 |

Primary Examiner—Anthony Bartis
Attorney, Agent, or Firm—Trexler, Bushnell, Giangiorgi & Blackstone, Ltd.

[57] ABSTRACT

A beverage brewing apparatus which includes a heated water reservoir, a heating element retained in the reservoir, and a thermostatic and a low water sensor configuration positioned in a heat exchange relationship with the heated water reservoir. The thermostatic and low water sensing configurations position the temperature sensors outside of the water reservoir to prevent the heated accumulation of mineral and other deposits thereon. A niche is formed in the wall of the heated water reservoir for receiving the thermostatic sensor configuration. A retaining cover is positioned over the niche to enclose the thermostatic sensor configuration in the niche. A portion of the niche against which the sensors are positioned is thinned in order to more accurately read the corresponding temperatures.

10 Claims, 9 Drawing Sheets

WATER HEATING APPARATUS HAVING A THERMAL AND LIQUID LEVEL SENSOR ASSEMBLY

This is a divisional application of U.S. patent application Ser. No. 07/786,306, filed Nov. 1, 1991 which was copending upon filing the present application and issued Oct. 12, 1993 as U.S. Pat. No. 5,251,541.

BACKGROUND OF THE INVENTION

The present invention is generally directed to a beverage brewing apparatus and the operational components which comprise the beverage brewing apparatus.

Many types of beverage brewing apparatus have been developed in order to accommodate the requirements and uses of various beverage brewing applications. In particular, a class of beverage brewing apparatus evolved to accommodate general consumer applications, such as for home use. A home brewing apparatus typically has a smaller per use brewing capacity than most commercial apparatus. Various consumer requirements have raised problems requiring solutions.

Generally, there are two branches of the home brewing apparatus class: a flash heating apparatus, and a pour-over or displacement apparatus. Both types of consumer beverage brewing apparatus typically are arranged with a hood portion which supports a brewing basket thereunder with a carafe or decanter positioned below. The hood portion is attached in some manner to a body portion which houses a reservoir. In the flash heating apparatus, a rapid heating element is positioned in the reservoir to quickly heat water which is then transported to the basket to infuse the brewing substance retained therein to create the brewed beverage. In the displacement system, the reservoir is sized to retain a prespecified quantity of water in a heated state so that when water is poured into the brewing apparatus heated water is instantly displaced from the reservoir to infuse the beverage brewing substance.

Both types of apparatus require water to be poured into the apparatus to brew a beverage. A problem arises when the decanter is used to measure and pour the water into the apparatus. This problem is common in the flash heating type apparatus and even more prevalent in the displacement type apparatus. In the displacement type apparatus, once the water is poured into the apparatus, the water instantly displaces heated water which almost instantaneously creates a stream of brewed beverage from the brewing basket. If the user does not quickly place the decanter underneath the basket, the brewed beverage will spill onto the heating pad which typically has begun to heat. Spilling of the brewed beverage can result in staining the heating pad as well as possibly the heating pad and any electrical connections associated with the heating pad.

Solutions of the above filling problem presented to date have not appeared to solve the problem. One easy solution provided the user with a decanter and a separate measuring container at the time the beverage brewing apparatus was purchased. This solution is both cumbersome and wasteful in that it requires a user to use two containers and requires the manufacturer to produce and package an additional container which would not be necessary if the filling problem could be solved. Clearly, if the measuring container becomes damaged, the user may resort to using the decanter for measuring brewing water or may have to find another container for measuring and pouring brewing water.

Other solutions have attempted to create an interlock drain valve between the funnel drain and the decanter. In such an apparatus placement of the decanter below the funnel operates a release mechanism operating a drain valve in the funnel. A problem arises when the interlocking mechanism becomes damaged or is not properly used and brewing water fills the basket which may result in an overflow of the brewing water, the beverage brewing substance, and the brewed beverage; thus creating a burdensome mess. Clearly, it would be more desirable to control the flow of brewing water before it has flowed to the brewing basket.

Prior beverage brewing apparatus also have a problem with moisture loss. Moisture loss is common in both the flash heating as well as the displacement brewing apparatus. In the flash heating apparatus, brewing water can be lost when the apparatus is employed with a timer such that the brewing water is disposed into a fill basin prior to the desired brewing time. Depending on the conditions, a considerable amount of brewing water may be lost through evaporation prior to brewing the beverage. In the displacement apparatus, evaporative loss is accelerated to a degree because a quantity of heated water is retained in the reservoir in a heated state. Naturally occurring air movement through the brewing apparatus combined with the heating of the water may result in considerable loss of brewing water. A reduced quantity of brewing water results in undesirable and uncontrolled variations in the resultant brewed beverage.

Safety concerns are extremely important in any type of beverage brewing apparatus. As such, it is important to provide safety features to prevent overheating of water as well as to turn off the heating element when the water heating reservoir is emptied. Typically, thermostatic probes have been employed to sense the temperature of the water in the heating reservoir. For example, in the displacement apparatus, a thermostatic probe senses the water temperature and correspondingly turns the heating element on or off in order to maintain a predetermined temperature range. Similarly, thermostatic sensors are commonly placed in or near the bottom of the heating reservoir in order to sense rapid changes in reservoir temperature. A rapid change in temperature indicates that the reservoir has been emptied because there is little or no water in which to distribute the thermal energy from the heating element. When the sensor senses that the reservoir is empty, the heating element is turned off. Clearly, this low water type sensor is important in any type of beverage brewing apparatus.

In most beverage brewing apparatus, the hood portion extends over the decanter and the brewing basket is suspended beneath the hood portion and above the decanter. A discharge tube extends from the heating reservoir through the hood portion to dispense water into the brewing basket. A sprayhead is usually employed to distribute the heated water more evenly over the beverage brewing substance retained in the brewing basket. As the sprayhead is positioned over the beverage brewing basket, it is prone to accumulate materials such as oils, chaff, and fine particulate matter carried in the steam which rises off of the beverage brewing substance during the infusion process. Therefore, it is desirable provide a sprayhead which is easily removable from the beverage brewing apparatus for cleaning and repair purposes.

In the manufacture of beverage brewing apparatus, it is desirable to produce a product which is pleasing to the eye in its final form as well as easy to assemble during the manufacturing process. Typically, a beverage brewing apparatus must be inverted and reverted during an assembly process. Therefore, it would be desirable to provide a beverage brewing apparatus which may be cumulatively assembled in one position throughout the entire assembly operation.

OBJECTS AND SUMMARY OF THE INVENTION

A broad general object of the present invention is to provide a beverage brewing apparatus which improves operating convenience, safety, the resulting brewed beverage, as well as the manufacturing assembly operation.

Another object of the present invention is to provide a beverage brewing apparatus which improves a thermostatic sensor configuration and a low water sensor configuration.

A further object of the present invention is to provide a beverage brewing apparatus which is more efficiently assembled during the manufacturing assembly process.

Briefly, and in accordance with the foregoing, the present invention comprises a beverage brewing apparatus which includes a heated water reservoir, a heating element retained in the reservoir, and a thermostatic and a low water sensor configuration positioned in a heat exchange relationship with the heated water reservoir. The thermostatic and low water sensing configurations position the temperature sensors outside of the heated water reservoir to prevent the accumulation of mineral and other deposits thereon. A niche is formed in the wall of the heated water reservoir for receiving the thermostatic sensor configuration. A retaining cover is positioned over the niche to enclose the thermostatic sensor configuration in the niche. A portion of the niche against which the sensors are positioned is thinned in order to provide more accurate temperature readings. The reservoir has a raised bottom portion proximate to the heating element. The low water sensor configuration is positioned in the raised bottom portion outside the reservoir.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 1:
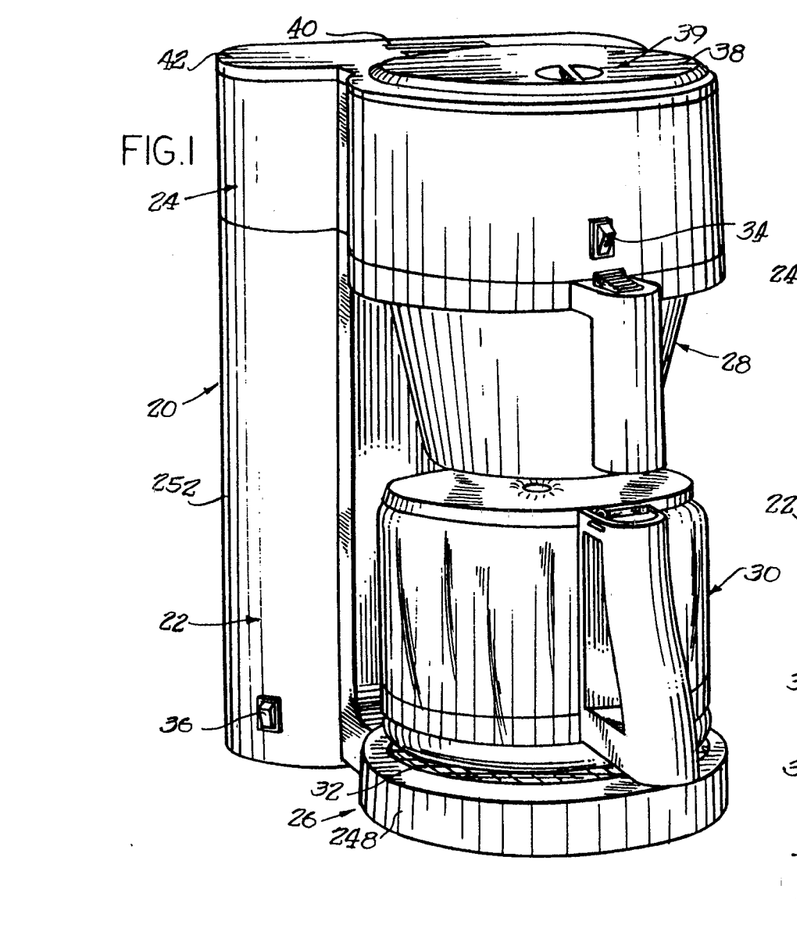
FIG. 1 is a perspective view of a beverage brewing apparatus of the present invention.

Referring now to the drawings, wherein like parts are designated by the same reference numerals throughout the figures, a beverage brewing apparatus or brewer 20 is shown in FIG. 1. The beverage brewing apparatus 20 includes a body structure 22, a hood assembly 24 attached to the top of the body structure 22, a base assembly 26 extending from the body structure 22 beneath the hood assembly 24, a brewing basket 28 suspended beneath the hood assembly 24, and a carafe 30 positioned beneath the basket 28 on the base assembly 26. The base assembly includes a warmer plate 32 which maintains the temperature of the brewed beverage retained in the carafe 30 (see also, FIG. 26). A first switch 34 is mounted on the hood assembly 24 and controls the warmer plate 32. A second switch 36, which controls the power to the brewer 20, is mounted in the lower section of the body structure 22. A lid 38 and multiple vents 40 are positioned on a top surface 42 of the hood assembly 24. The construction and operation of the lid 38 and vents 40 will be discussed in greater detail hereinbelow.

Figure 2:
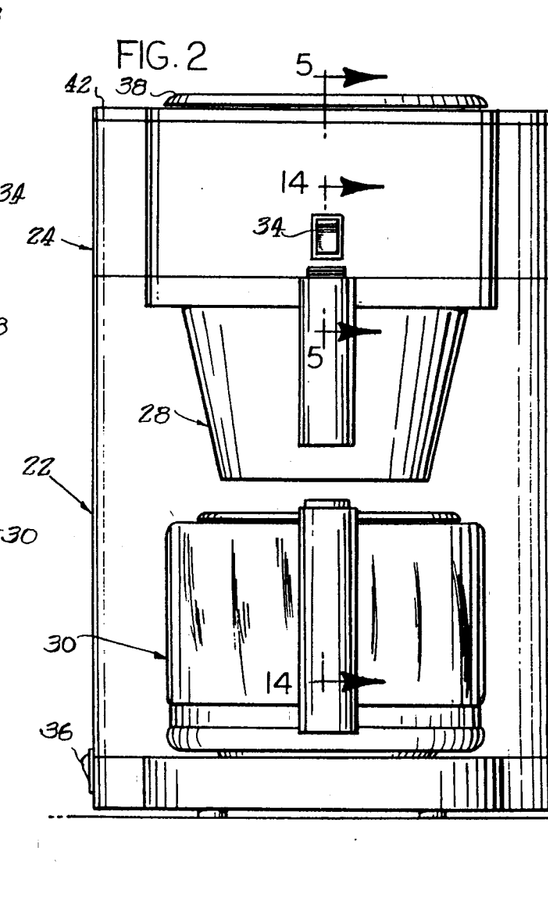
FIG. 2 is a front elevational view of the beverage brewing apparatus.
Figures 3, 4:
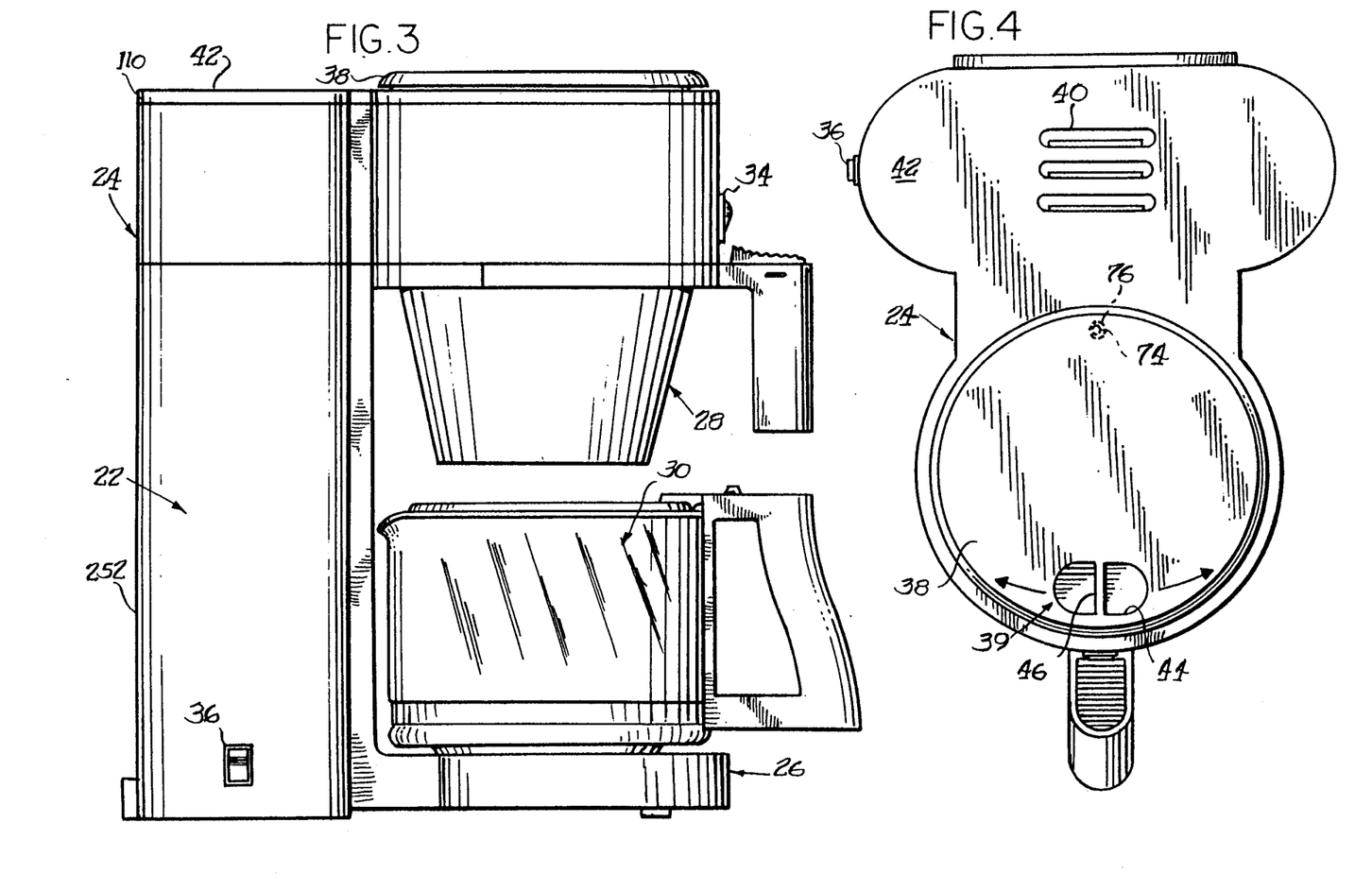
FIG. 3 is a side elevational view of the beverage brewing apparatus.
FIG. 4 is a top plan view of the beverage brewing apparatus.

FIGS. 2, 3 and 4 show additional views of the beverage brewing apparatus 20 from a front, side elevation, and top plan view, respectively. As shown in FIGS. 1 and 4, a set of depressions 44 project into the surface of the lid 38 and have a ridge 46 therebetween forming a finger grip for moving the lid 38.

Figure 5:
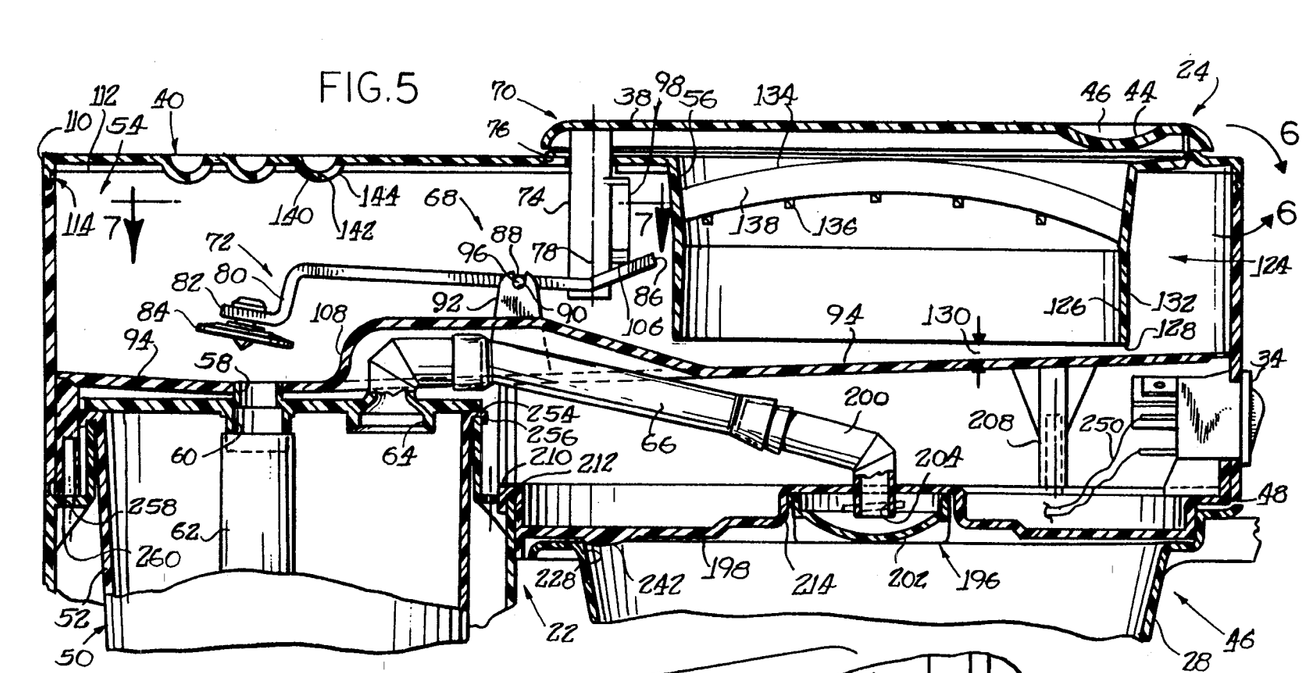
FIG. 5 is an enlarged partial fragmentary cross-sectional view of the present invention taken through a hood portion along line 5—5 in FIG. 2.

FIG. 5 provides a partial fragmentary cross-sectional view taken along line 5—5 in FIG. 2. Generally, FIG. 5 shows a cross-section through the hood assembly 24 but also shows an upper portion of a brewing assembly 46 suspended from a suspension portion 48 of the hood assembly 24, and an upper portion of a reservoir assembly 50 retained inside of the body structure 22. While the lower portion of the reservoir assembly 50 is not shown, a reservoir or tank 52 of the reservoir assembly 50 extends downwardly to a closed bottom (as better shown in FIG. 14).

The hood assembly 24 includes a fill basin 54 into which brewing water is poured to displace heated water retained in the tank 52. Water is poured into the fill basin 54 through an opening 56 formed through the top surface 42 of the hood assembly 24. Water disposed into the fill basin 54 flows through a fill port 58 formed in a lowermost portion thereof. Water passes from the fill port 58 through the entry port 60 into a fill tube 62 which directs the flow downwardly towards the bottom of the tank 52. When fill water displaces the heated water retained in the tank 52, the heated water is forced upwardly through a drain port 64 formed near the top of the tank 52 and out through a discharge tube 66 to the brewing assembly 46.

A fill water control assembly 68 controls the flow of water through the brewer 20. The fill water control assembly 68 includes a lid assembly 70 and a valve 72. The lid assembly 70 includes the lid member 38 and a shaft 74 attached thereto and projecting downwardly into the hood assembly 24 through an assembly hole 76 centered on and formed through the top surface 42 of the hood assembly 24 behind the opening 56. As shown, the lid member 38 is sized and dimensioned for covering the opening 56 and is integrally formed with the shaft 74 as a single piece unitary body. The lid member 38 rotates about a shaft axis 78 extending through the shaft 74. When the lid member 38 is rotated about the shaft axis 78 the lid 38 is moved to the side of the opening 56 thereby uncovering the opening 56 to provide access to the fill basin 54.

The valve 72 of the fill water control assembly 68 includes an arm member 80 having a first end 82 with a stopper 84 attached thereto. The primary purpose of the valve 72 is to control the flow of water to the brewing assembly 46 before it is discharged to the basket 28. The stopper 84 is movably positioned over the fill port 58. The shaft 74 extends through a hole 85 in the second end 86 of the arm member 80 coupling the shaft 74 with the arm member 80 in a manner that translates rotational movement of the shaft 74 into rotational movement of the arm member 80. An axle 88 attached to the arm member 80 is positioned in a rocker slot 90 on a base structure 92. Support of the arm 80 by a base structure 92 permits rotation of the first and second ends 82,86 of the arm 80 about a pivot axis 96 positioned intermediate the first end 82 and the second end 86 extending through the axle 88 when the shaft 74 is rotated. While FIG. 5 shows a base structure 92 mounted to a bottom 94 of the basin 54, the base structure 92 could also be mounted overhead while achieving the same function.

Figure 5A:
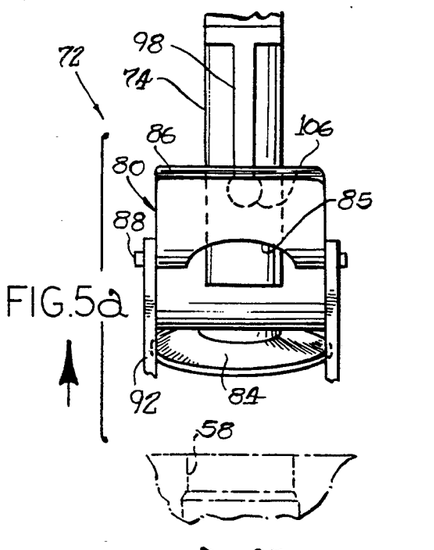
FIG. 5a is a partial fragmentary rear elevational view of the valve assembly as illustrated in FIG. 5.
Figure 8:
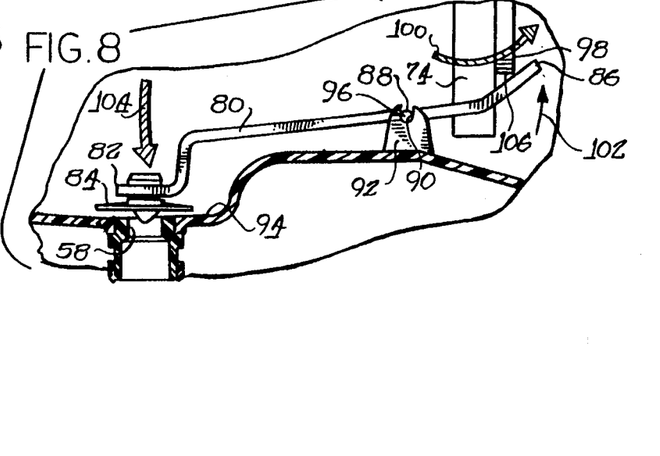
FIG. 8 is a partial fragmentary cross-sectional view of the valve assembly in a closed position.
Figure 8A:
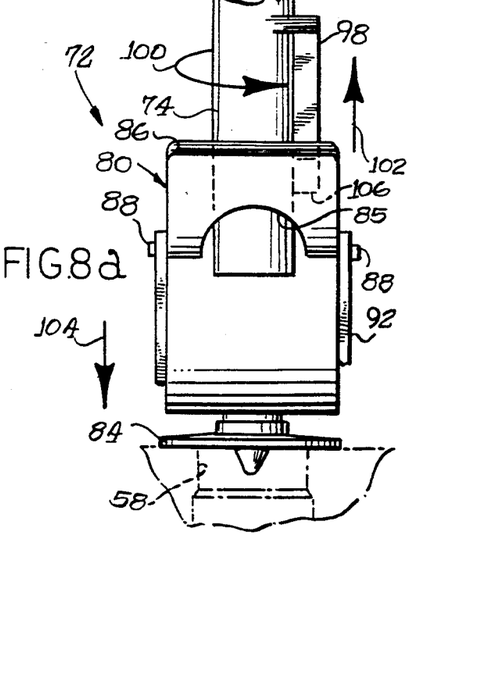
FIG. 8a is a partial fragmentary rear elevational view of the valve assembly as illustrated in FIG. 8.

As shown in FIG. 5, the lid 38 is positioned to cover the opening 56. With additional reference to FIG. 5a, when the lid 38 covers the opening 56 a fin 98 extending generally perpendicularly away from the shaft 74 presses against the second end 86 of the arm 80 to lift the stopper 84 away from the fill port 58. With reference to FIGS. 8 and 8a, when the shaft 74 is rotated (as indicated by arrow 100) by moving the lid member 38 to either side of the opening, the angled second end 86 of the arm 80 rotates upwardly (as indicated by arrow 102) about the pivot axis 96 and correspondingly the first end 82 rotates (as indicated by arrow 104) downwardly about the pivot axis 96 causing the stopper 84 to plug the fill port 58.

In this position, since the lid member 38 has been moved away from covering the opening 56, water may be poured into the fill basin 54 through the opening 56 and will not drain into the tank 52 since the valve 72 has plugged the fill port 58. A bottom edge 106 of the fin 98 is rounded to facilitate rotation 102,104 of the arm 80. Closing the lid member 38 over the opening 56 once again rotates the shaft 74 thereby imposing forces on the second end 86 which lift the stopper 84 away from the fill port 58 allowing water in the fill basin 54 to flow into the tank 52.

The fill basin 54 is formed with a bottom 94 which slopes downwardly from all edges towards the fill port 58. A raised portion 108 of the bottom 94 provides elevation for the base structure 92 of the valve 72. Water in the fill basin 54 flows around the raised portion 108 to the fill port 58.

Figure 6:
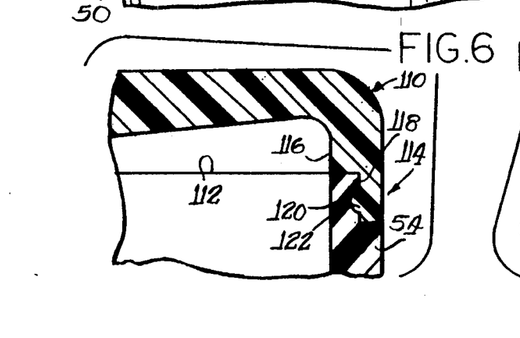
FIG. 6 is an enlarged detail of a snap-fit assembly as shown in FIG. 5.
Figure 7:
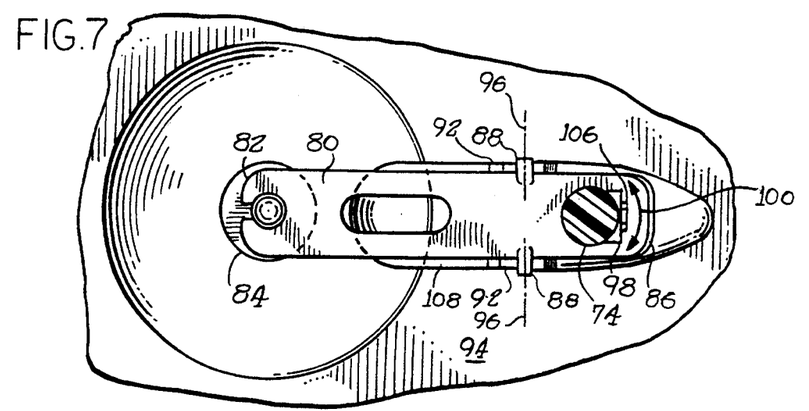
FIG. 7 is a top plan view of a valve of a lid assembly taken along line 7—7 in FIG. 5.

FIG. 6 illustrates an enlarged partial fragmentary view of an upper portion of the hood assembly 24 as illustrated in FIG. 5. With reference to FIGS. 5 and 6, a cover 110 is attached to a top edge 112 of the fill basin 54. Engagement of the cover 110 with the top edge 112 is accomplished by a snap-fit means 114 formed on an inside surface 116 of the cover 110 and on a corresponding outside surface 118 of the fill basin 54. As shown, the snap-fit means 114 includes a male portion 120 formed on one of the surfaces and a female portion 122 formed on the other surface to provide a frictional engagement therebetween to prevent the cover 110 from being removed from the top edge 112 of the fill basin 54. Clearly, other snap-fit or press-fit means may be employed to attach the cover 110 to the fill basin 54, however, the cover 110 is attached without fasteners. Attachment by snap-fit means 114 greatly facilitates assembly of the brewer 20 as will be discussed in greater detail hereinbelow.

FIG. 5 illustrates a moisture recovery assembly 124 which collects and returns moisture which evaporates from the basin water to the fill basin 54. Included in the moisture recovery assembly 124 is a hollow sleeve 126 which is attached to the cover 110 and extends downwardly into the fill basin 54 towards the bottom 94. The opening 56 extends through the hollow sleeve 126. A lower end 128 of the sleeve 126 is spaced in close proximity to the bottom of the basin 94, separated only by a small gap 130.

Moisture which collects on the inside of the fill basin 54 can collect on an outside surface 132 of the sleeve 126 and drain back into the fill basin 54. Because the sleeve projects downwardly into the fill basin 54 very close to the bottom 94 leaving only the small gap 130 therebetween, only the surface area of the water inside of the sleeve 126 is potentially exposed to evaporative air currents through the opening 56. Additionally, moisture which does rise off of the water inside of the hollow sleeve 126 may collect on a grill structure 134 extending over the opening 56. The grill structure 134 has numerous cross members 136,138 running generally perpendicularly to one another. The grill structure 134 has a generally partially spherical shape which aids in directing water which condenses thereupon back into the fill basin 54.

Another component of the moisture recovery assembly 124 are the vents 40 which project through the top surface 24 of the cover 110. As shown in the plan view of FIG. 4, the vents 40 have a generally elongated shape and are positioned in series generally parallel to one another on the top surface 42 of the cover 110. The vents 40 have an inwardly projecting collecting portion 140 and a baffle opening 142 formed through a side 144 thereof. Forming the baffle openings 142 through a side 144 helps reduce the flow of air therethrough yet permits displacement of air therethrough when water is poured into the fill basin 54 through the opening 56 in hollow sleeve 126. The downwardly extending collecting portion 140 provides a point at which condensation which collects thereon can drip downwardly into the fill basin 54. Between brew cycles, when the fill basin 54 is empty, some moisture may rise through the fill tube 62 from the tank 52 since the stopper 84 does not seal the fill port 58 between brew cycles. Moisture which rises from the fill tube 62 may either collect on the stopper 84 and drip back into the fill basin 54 or may collect on the collecting portion 140 and drip back into the fill basin 54.

Turning now to the reservoir assembly 50 as illustrated in FIGS. 14–20, a thermostat configuration 146 and a low water sensing configuration 148 are shown. As best shown in FIGS. 14–17, the thermostat configuration 146 is arranged with a thermostatic sensor 150 of known construction positioned outside of the tank 52 and sensing temperature through the side wall of the tank 52. The thermostatic sensor 150 is positioned behind a first portion 152 which has a thickness dimension which is substantially smaller than a thickness dimension 156 of the surrounding side wall 158. Positioned in close proximity to the first portion 152 (see FIG. 16) the thermostatic sensor 150 accurately reads the temperature of the water inside of the tank 52 through the first portion 152.

Figures 14, 16, 17:
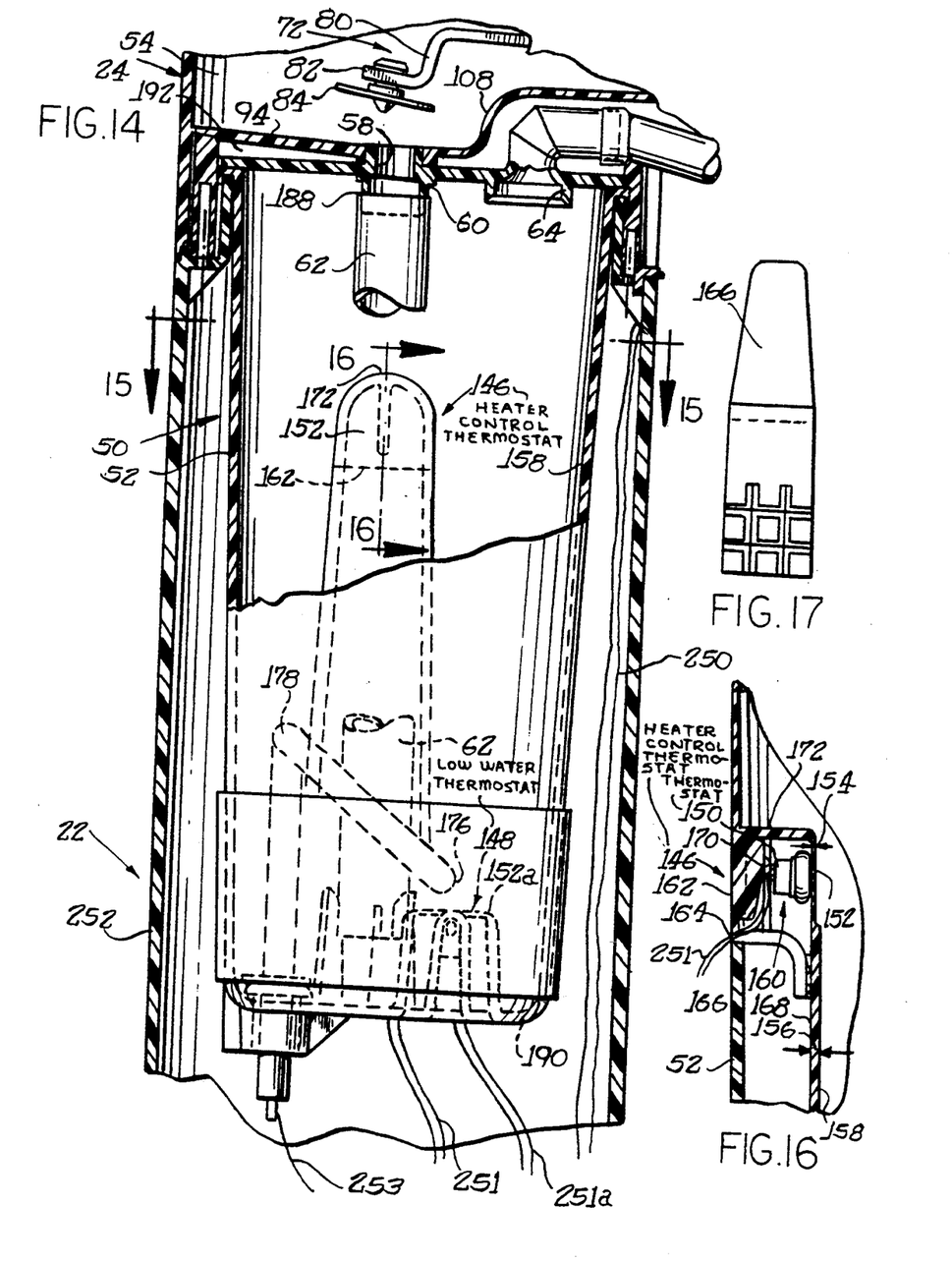
FIG. 14 is an enlarged partial fragmentary cross-sectional view of a reservoir assembly of the present invention taken along line 14—14 in FIG. 2.
FIG. 16 is an enlarged partial fragmentary cross-sectional view of a thermostat configuration employed in the reservoir assembly of the present invention taken along line 16—16 in FIG. 14.
FIG. 17 is an enlarged side elevational view of a retaining cover used in the thermostat configuration.

The thermostat configuration 146 also includes a thermostat niche 160 which projects into the side wall 158 of the tank 52. The thermostat niche 160 protects the thermostatic sensor 150 from unintended impacts and from air movements which may affect temperature readings. As shown in FIGS. 16, the niche 160 includes a skirted portion 162 which results in enclosing the thermostatic sensor 150 on all sides but the bottom 164. To cover the bottom portion, a retaining cover 166 is provided to fit into the thermostat niche 160 with a press fit between an outside surface 168 of the side wall 150 and an inside surface 170 of the skirt 162.

The sensor 150 is positioned to sense the water temperature through the first portion 152 which is vertically oriented and formed in the side wall 158. The vertical orientation of the first portion 152 prevents accumulation of sediment and mineral deposits thereupon which would otherwise occur if the first portion 152 was horizontally positioned. A sedimentation layer build-up on a horizontally oriented first portion 152 would interfere with accurate sensor readings. Accuracy of the sensor's readings is improved by the vertical orientation of the first portion 152 in the present invention. A top portion 172 of the niche 160 is curved to help further reduce any accumulation of sedimentation or deposits which might otherwise accumulate and extend over the first portion 52.

Figures 15, 18, 19, 20:
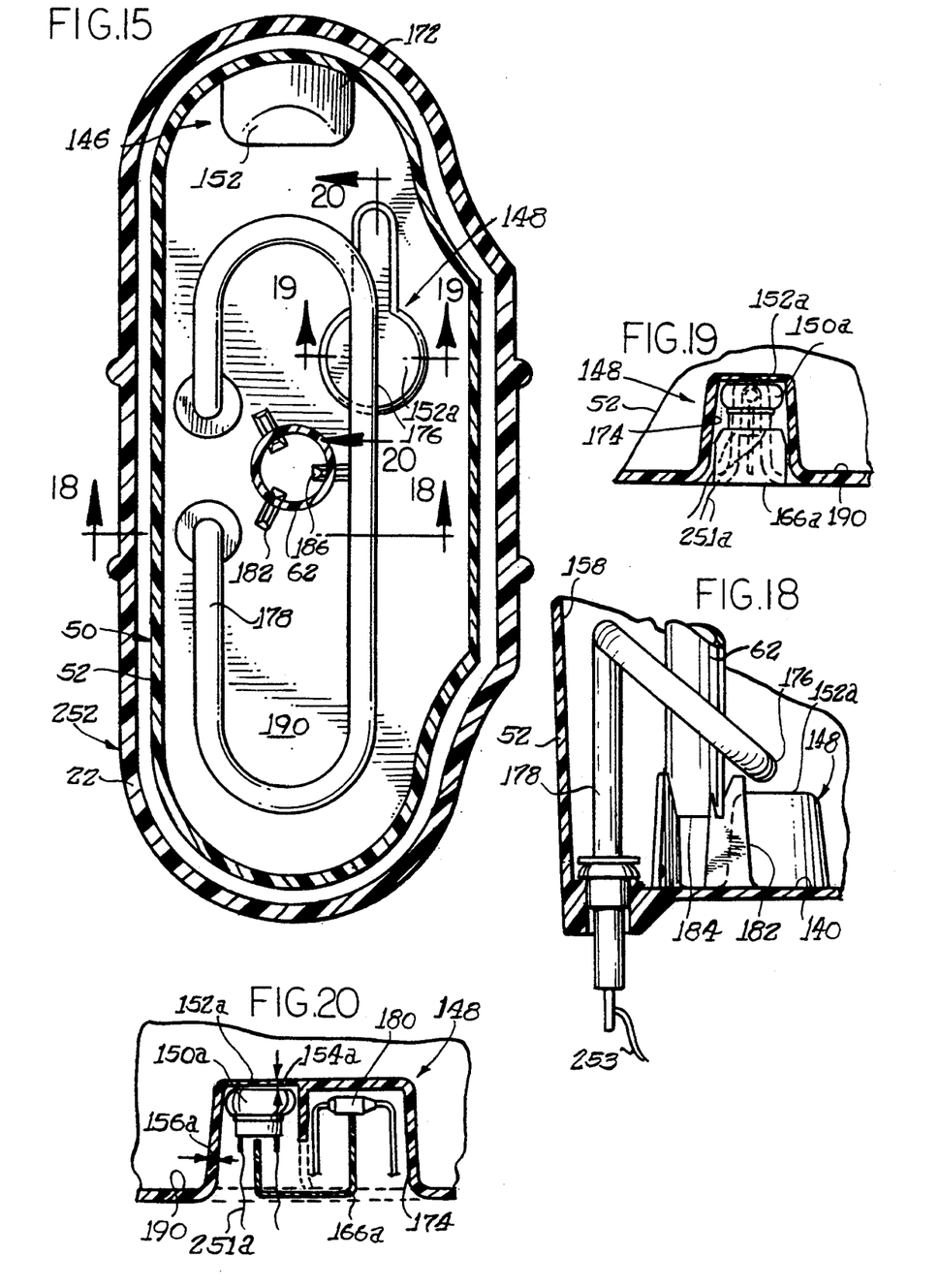
FIG. 15 is a cross-sectional view of the reservoir assembly taken along line 15—15 in FIG. 14.
FIG. 18 is a partial fragmentary cross-sectional view of a bottom portion of the reservoir assembly taken along line 18—18 in FIG. 15.
FIG. 19 is a partial fragmentary cross-sectional view of a low water sensing configuration taken along line 19—19 in FIG. 15.
FIG. 20 is a partial fragmentary cross-sectional view of the low water sensing configuration taken along line 20—20 in FIG. 15.

Similar to the thermostat configuration 146, the low water sensing configuration 148 is arranged with a thermostatic sensor 150a positioned behind a first portion 152a which has a reduced thickness dimension 154a compared to the wall dimension 156a of the surrounding side walls 158a. Common elements of the thermostat configuration 146 and the low water sensing configuration 148 are denoted with a common reference numeral, however, a suffix (for example "a") has been added to the common reference numeral to denote the low water sensing configuration 148 components.

A low water sensor niche 174 houses the thermostatic sensor 150a of the low water sensing configuration 148. In the low water sensing configuration 148 the first portion 152a is formed in a top surface of the sensor niche 174. While the first portion 152a in the low water sensing configuration 148 is prone to accumulate sedimentation and mineral deposits as discussed above, such accumulations have a minor effect in the low water sensing configuration 148 as compared to the thermostat configuration 146. For example, the thermostat configuration 146 is used to sense subtle differences in water temperature to maintain the water temperature within a predetermined desired range, for example 195° F. ±10° F. On the other hand, the low water sensing configuration 148 is used to sense gross temperature changes inside of the tank 52.

To further facilitate accurate and quick response time in a low water condition, the first portion 152a is positioned beneath the lowermost portion 176 of a heating element 178. The close proximity of the lowermost portion 176 of the heating element 178 to the first portion 152a results in the thermostatic sensor 150a behind the first portion 152 quickly sensing a low water condition.

A retaining cover 166a is used to retain the thermostatic sensor 150a in a close position behind the first portion 152a. Additionally, a fuse 180 fuse 180 is positioned in the low water sensor niche 174 next to the thermostatic sensor 150a for rapidly responding should a low water condition arise thereby providing additional safety and preventing a potential problem.

The fill tube 62 is shown in FIGS. 14, 15 and 18 engaged with a group of fill tube retainers 182. The fill tube retainers 182 engage a lower portion 184 of the fill tube 62 in a notch 186 while an upper end 188 is mated with the entry port 60. The fill tube retainers 182 maintain the lower end 84 a distance above a bottom surface 190 of the tank 52. When a cap member 192 is attached to the top rim 194 of the tank 52 the fill tube 62 mated with the entry port 60 and engaged with the fill tube retainers 182 is securely retained and thus prevented from disengaging or flexing into contact with the heating element 178. As shown in FIGS. 14, 15 and 18, the fill tube 62 extends through the loop of the heating element 178.

The tank 52 is integrally formed as a single piece body of a suitable plastic material having heat resistant characteristics capable of continuously withstanding substantially on the order of up to 205°. An example of such material is ULTEM® which is an amorphous thermoplastic polyetherimide produced by GE Plastics of Pittsfield, Mass. In particular, ULTEM® 1010 is a preferred form of the material for this application although other materials may be selected.

Figure 22:
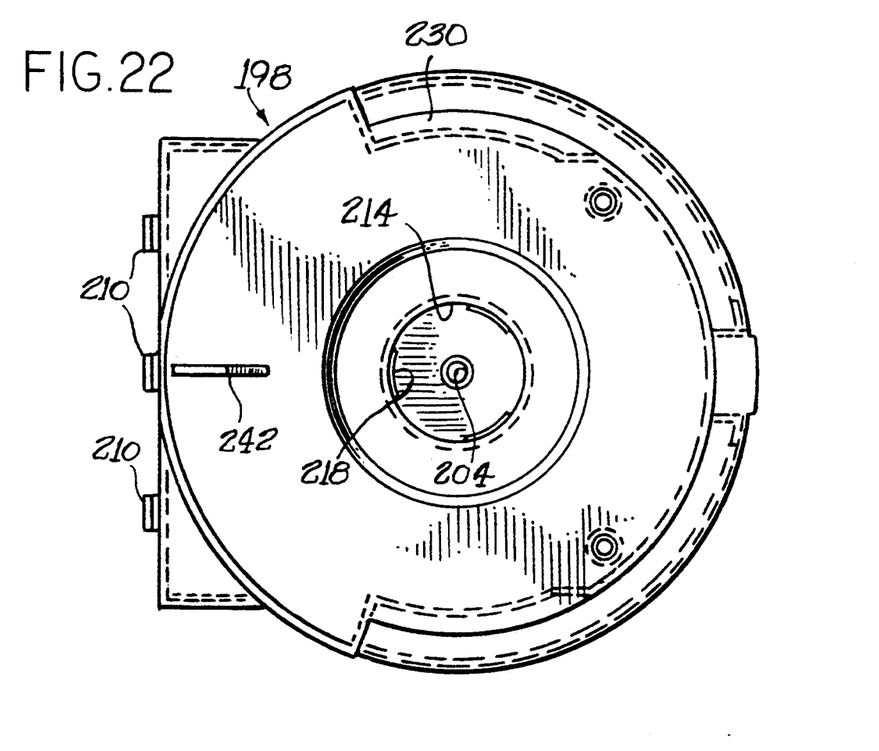
FIG. 22 is a bottom plan view of the suspension portion.
Figure 23:
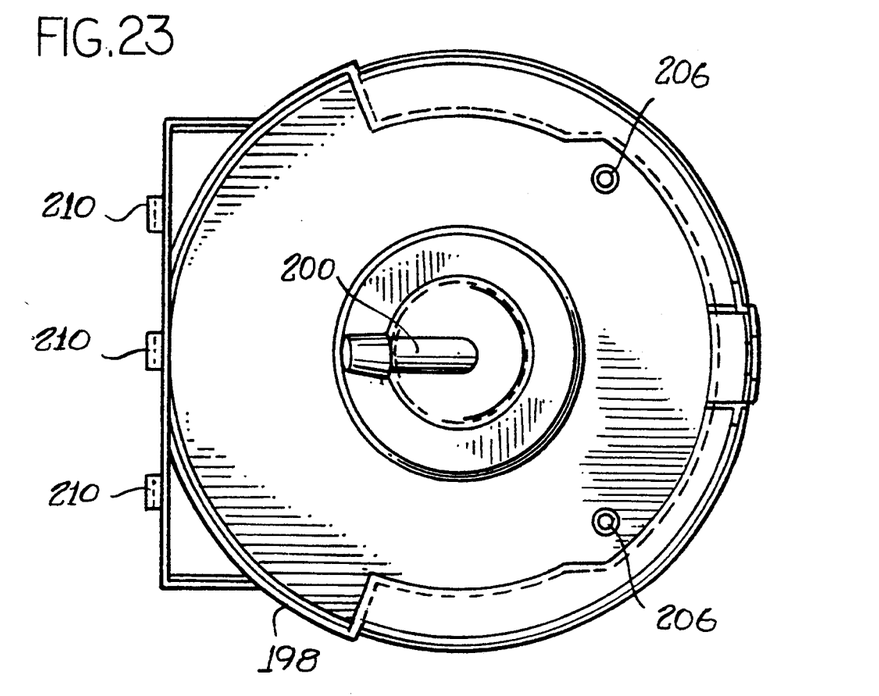
FIG. 23 is a top plan view of the suspension portion.
Figure 24:
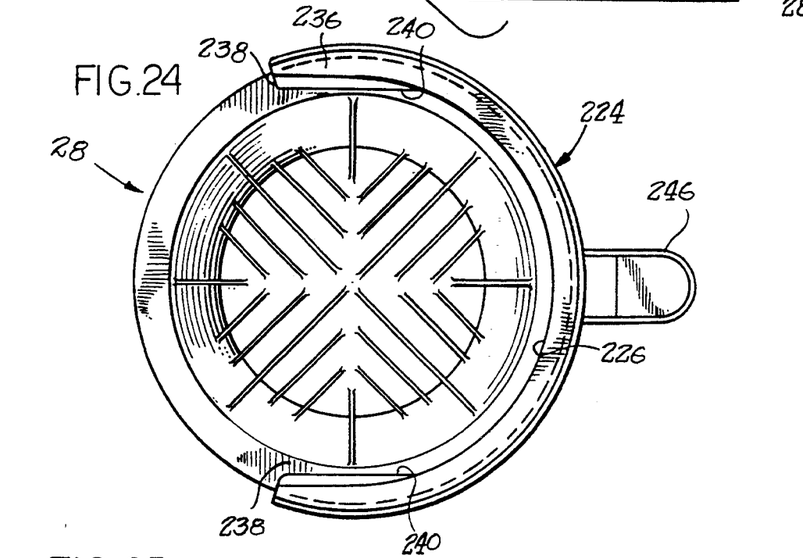
FIG. 24 is a top plan view of the beverage brewing basket as illustrated in FIG. 21.

A sprayhead assembly 196 is shown in FIG. 5 and further detailed in FIGS. 9-13, 22 and 23. The spray assembly 196 includes a spray panel 198 which is mounted to the suspension portion 48 having a discharge nozzle 200 attached thereto, and a sprayhead member 202 attachable to said spray panel 198 over a discharge port 204 of said discharge nozzle 200. The sprayhead assembly 196 is positioned in an upper portion of the brewing assembly 46 and delivers water thereto through the discharge nozzle and distributed by the sprayhead member 202. As shown in FIGS. 22 and 23, the sprayhead panel 198 has mounting holes 206 formed therethrough which are alignable with mounting posts 208 formed on the suspension portion 48. Additional mounting support for the spray panel 198 is provided by the mounting tabs 210 which engage an upper edge 212 of the body structure 22. As will be discussed further hereinbelow, the spray panel 198 must be mounted in such a way so as to support the brewing assembly 46 when the basket 28 is filled with a beverage brewing substance as well as brewing water during a brew cycle.

A sprayhead recess 214 is formed in the sprayhead panel 198 to prevent the sprayhead member 202 from interfering with the basket 28 when the basket is mounted thereto. As better shown in the enlarged partial fragmentary cross-sectional views of FIGS. 9 and 10, the sprayhead member 202 mounts inside of the sprayhead recess 214 by way of engagement means 216. The engagement means 216 include partial thread portions 218 which are formed on an outside surface of the sprayhead member 202 and on an inside surface of the sprayhead recess 214. Engagement of the sprayhead member 202 with the sprayhead recess 214 is facilitated by a grip portion 220 which is formed as a raised extended portion extending across the face of the sprayhead member 202.

Figure 9:
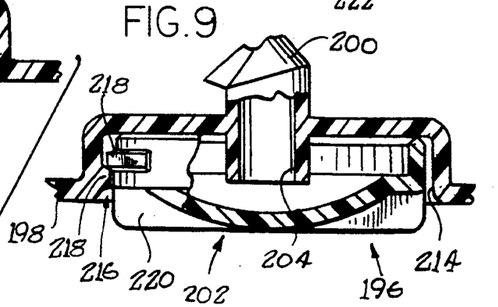
FIG. 9 is an enlarged partial fragmentary cross-sectional view of a spray assembly as illustrated in FIG. 5.
Figure 10:
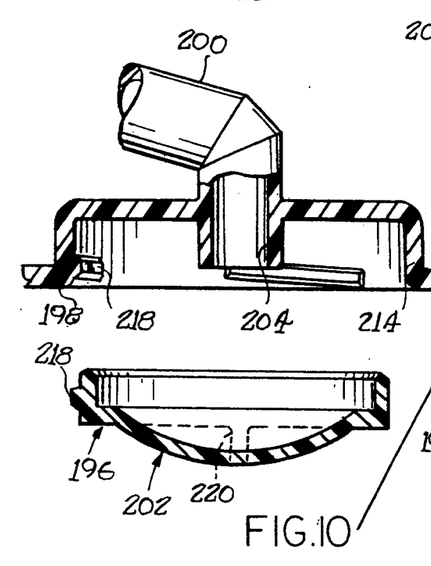
FIG. 10 is the spray assembly as illustrated in FIG. 9 in which a sprayhead member has been disengaged from the sprayhead assembly.
Figure 11:
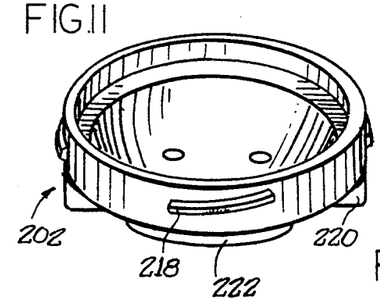
FIG. 11 is a perspective view of the sprayhead member.
Figure 12:
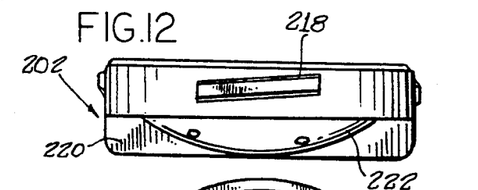
FIG. 12 is a side elevational view of the sprayhead member.
Figure 13:
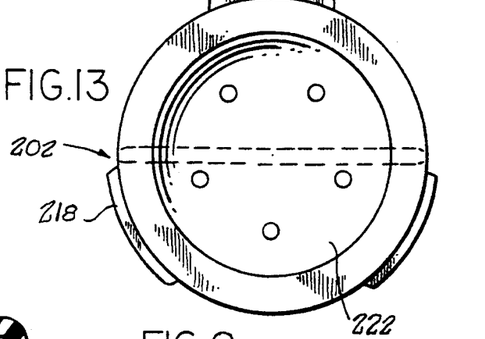
FIG. 13 is a bottom plan view of the sprayhead member.

A foraminous face 222 having a generally partially spherical shape is provided on the sprayhead member and positioned immediately below the discharge port 204 when the sprayhead 202 is mounted to the sprayhead recess 214. Brew water discharged through the discharge nozzle 200 flows through the foraminous face 222 to provide a generally even distribution of water over the beverage brewing substance retained in the basket 28. The construction of the sprayhead 202, which is an integrally formed single piece unitary body, including the grip portion 220, facilitates easy removal from the sprayhead recess 214 to facilitate cleaning. It is important to be able to remove the sprayhead 202 since material may build up in the holes of the foraminous face 222 due to sedimentation particles and coffee oils which are carried in steam which rises from the beverage brewing substance during the brewing process.

FIGS. 21-25 provide details as to the structure and function of the brewing assembly 46 and mounting means 224 for attaching the basket 28 to the suspension portion 48 of the hood assembly 24. The mounting means 224 include a partially circumferential channel 226 attached to the upper edge 228 of the basket 28 and a partially circumferential rim 230 attached to an outwardly facing surface 232 of the spray panel 198. The resulting engagement of the mounting means 224 conceals the mounting means 224 behind a generally continuous surface 234. The partially circumferential channel 226 has an upper lip 236. Leading edges 238 of the upper lip 236 are generally spaced apart on the open end of the partially circumferential channel 226 and have parallel edge portions 240 which help to guide the channel 226 into engagement with the rim 230. The generally parallel portion 240 also help prevent the basket 28 from swivelling when engaged with the rim 230.

Figure 21:
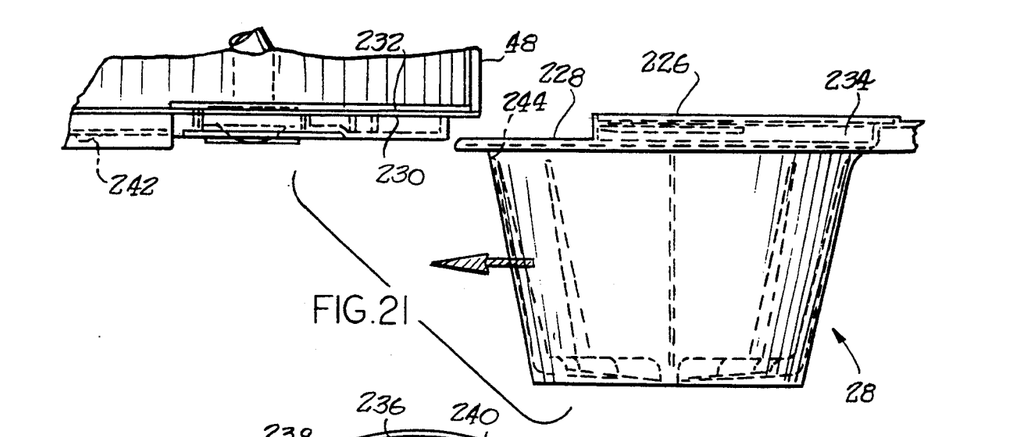
FIG. 21 is a partial fragmentary side view of the brewing assembly of the present invention showing engagement mounting means for retaining a brewing basket on a suspension portion of the brewing apparatus.
Figure 25:
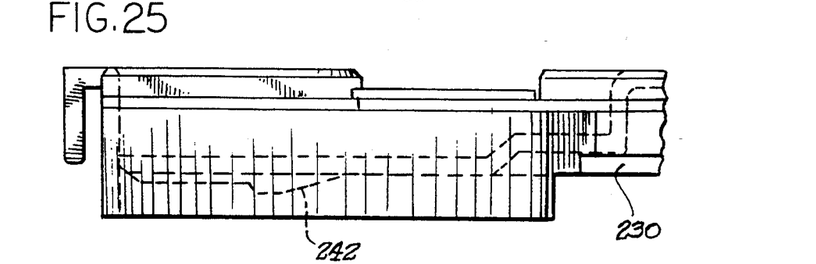
FIG. 25 is an enlarged partial fragmentary side elevational view of a rear portion of the suspension portion of the beverage brewing apparatus.

A retaining protrusion 242 extends downwardly from a surface of the spray panel 198 generally opposite the mounting means 224. The protrusion 242 engages the inside of a front edge 244 to provide additional retaining force when the basket 28 is engaged with the suspension portion 48. When removing the basket 28, a slight force is applied to a handle 246 of the basket 28 to overcome the retaining force created by the protrusion on the inside front edge 244.

Figure 26:
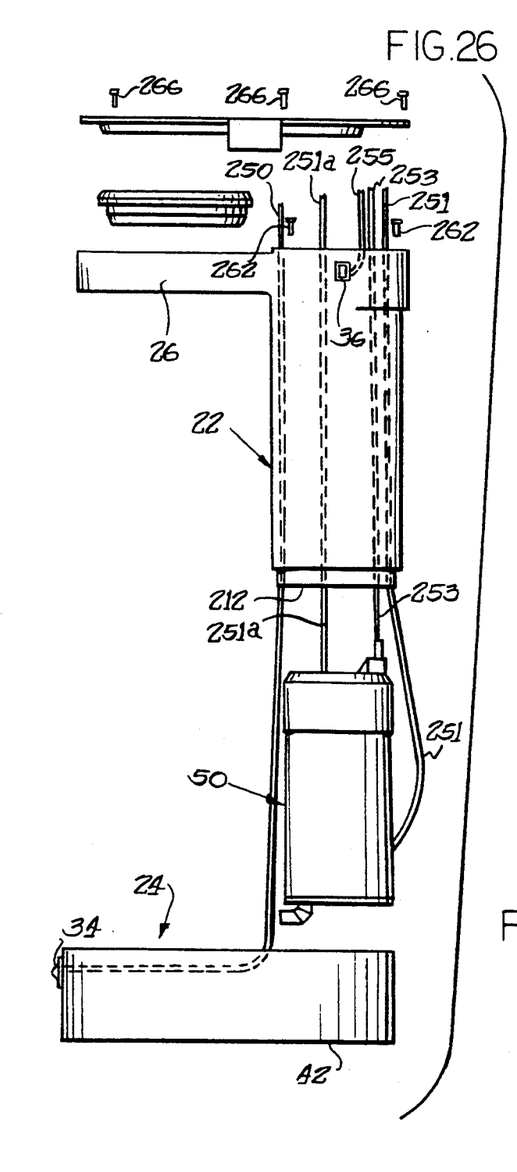
FIG. 26 is an exploded side elevational view of the assembly of sub-assemblies of the present invention.

The present invention additionally includes a novel method for assembling the brewer 20 of the present invention as illustrated in FIG. 26. Generally, the brewer 20 is assembled into subassemblies which are then assembled in a continuous process wherein the subassemblies are stacked and secured to one another. With reference to FIGS. 1, 14, and 26, the major subassemblies include the hood portion 24, the reservoir assembly 50, the body structure 22 and a base assembly 248.

Referring to FIGS. 1 and 14, the hood assembly 24 is assembled and placed in an inverted orientation on an assembly line. Wires 250 extending from the first switch 34 in the hood assembly 24 are threaded through the hood assembly 24 prior to engagement of the reservoir assembly 50 thereto. In the next assembly step, the reservoir assembly 50 is inverted and engaged with the hood assembly 24. A hollow tower portion 252 of the body structure 22 is assembled over the inverted reservoir assembly 50 and engaged with the hood assembly 24. The wires 250 from the first switch 34 are threaded through the hollow tower portion 252 prior to the engagement with the hood portion 24. Wires 251, 251a, 253 leading from the thermostatic sensors 150, 150a and the heating element 178, respectively, are also threaded through the hollow tower portion 252. Similarly, wires 255 from the second switch 36 are threaded through the tower portion 252.

As best shown in FIG. 5, an engaging edge 254 of the body structure 22 engages a lip 256 of the reservoir assembly 50. The edge 254 and lip 256 structurally support the reservoir assembly 50 inside of the body structure 22 when the brewing apparatus, as finally assembled, is re-inverted. Screw holes 258 are formed through a ledge 260 of the body structure 22 for receiving fasteners 262 therethrough. The fasteners 262 engage mounting posts 264 which are formed on a cooperative surface of the hood portion 24. In the inverted orientation, the fasteners 262 are driven into the mounting posts 264 to securely engage the hood portion 24, reservoir assembly 50, and body structure 22.

The final step of the assembly process includes attaching the wires 250, 251, 251a, 253, 255 to appropriate connections in the base assembly 248. The base assembly 248 is inverted and the warming plate 32 is positioned inside the opening formed in the base structure 26. Once the base assembly 248 is properly positioned fasteners 266 are driven through holes in the base assembly and into mounting posts which are cooperatively formed and positioned on the inside of the body structure 22 (mounting posts not shown).

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. In a water heater assembly of a beverage brewing apparatus, said water heating assembly including a reservoir for retaining water during heating and a heating element for heating water contained in the reservoir controlled by a thermostat assembly and a low water sensing assembly having a thermostatic sensor, said reservoir having a vertical side wall, the improvement wherein said thermostat assembly and said low water sensing assembly comprises:
    a reduced thickness portion of said side wall, said reduced thickness portion having a thickness which is less than that of the side wall area immediately surrounding said portion, said reduced thickness portion being located at a position on said side wall vertically spaced away from said heating element;
    said thermostatic water temperature sensor being retained outside of said reservoir in a heat exchange relationship with said reduced thickness portion such that said thermostatic sensor senses the temperature of water in said reservoir from the outside of the reservoir through said reduced thickness portion, a raised portion of said bottom projecting upwardly away from the surface of the surrounding area towards and in close heat transfer proximity to said heating element, said heating element having a base connectable to an electrical source, said base being spaced apart from said raised portion for preventing inaccurate temperature readings by said low water sensing assembly;
    said raised portion of said bottom having a reduced thickness portion defined thereon, said reduced thickness portion having a thickness which is less than the surrounding area of said bottom, said reduced thickness portion being positioned and in close heat exchange proximity to said heating element and spaced upwardly away from said bottom; and
    said thermostatic sensor retained outside of said reservoir in close heat exchange proximity to said first portion such that said thermostatic sensor senses the temperature in said heating element from the outside of reservoir through said reduced thickness portion when the water level in said reservoir drops below a predetermined level.

2. In a water heater assembly of a beverage brewing apparatus according to claim 1 wherein said reservoir is formed of a suitable plastic material having heat resisting characteristics capable of continuously withstanding substantially on the order of 205° F.

3. In a water heater assembly of a beverage brewing apparatus according to claim 1 further including an inwardly protruding portion of said side wall of said reservoir defining a thermostat niche, said reduced thickness portion being formed in said thermostat niche, said thermostatic sensor being retained in said thermostat niche, said thermostat niche shielding said thermostatic sensor from impact and air movements external to the reservoir.

4. In a water heater assembly of a beverage brewing apparatus according to claim 3 wherein said reduced thickness portion is positioned on a vertical side of said thermostat niche for preventing the accumulation of sedimentation and mineral deposits on said reduced thickness portion.

5. In a water heater assembly of a beverage brewing apparatus according to claim 4 further including a retaining cover engageable with said thermostat niche for retaining said thermostatic sensor in said thermostat niche and shielding said thermostatic sensor from errant air movements.

6. In a water heating assembly of a beverage brewing apparatus, said water heating assembly including a reservoir for retaining water and a heating element in said reservoir for heating water contained therein and controlled by a low water sensing assembly having a thermostatic sensor, said reservoir having side walls and a bottom, the improvement wherein said low water sensing assembly comprises:
    a raised portion of said bottom projecting upwardly away from the surface of the surrounding area towards and in close heat transfer proximity underneath said heating element, said heating element having a base connectable to an electrical source, said base being spaced apart from said raised portion for preventing inaccurate temperature readings by said low water sensing assembly;
    said raised portion of said bottom having a reduced thickness portion defined thereon, said reduced thickness portion having a thickness which is less than the surrounding area of said bottom, said reduced thickness portion being positioned in close heat exchange proximity directly below said heating element and spaced upwardly away from said bottom; and
    said thermostatic sensor retained outside of said reservoir in close heat exchange proximity to said first portion such that said thermostatic sensor senses the temperature in said heating element from the outside of said reservoir through said reduced thickness portion when the water level in said reservoir drops below a predetermined level.

7. In a water heating assembly of a beverage brewing apparatus according to claim 6 wherein said reservoir is formed of a suitable plastic material having heat resisting characteristics capable of continuously withstanding substantially on the order of 205° F.

8. In a water heating assembly of a beverage brewing apparatus according to claim 6 further wherein said upwardly projecting raised portion of said bottom protrudes upwardly into the interior of said reservoir to define a low water sensor niche, said reduced thickness portion being formed in a wall of said low water sensing niche, said thermostatic sensor being retained in said low water sensor niche, and said low water sensing niche shielding said thermostatic sensor from impact and air movements external to said reservoir.

9. In a water heating assembly of a beverage brewing apparatus according to claim 8 wherein said low water sensing niche protrudes upwardly into said reservoir in close heat exchange proximity said heating element and said reduced thickness portion is positioned in close proximity to said heating element such that a low water level condition is quickly sensed by said thermostatic sensor when the water level in said reservoir drops below a predetermined level.

10. In a water heating assembly of a beverage apparatus according to claim 8 further including a retaining cover engageable with said low water sensing niche for retaining said thermostatic sensor in said low water sensing niche and shielding said thermostatic sensor.

* * * * *

UNITED STATES PATENT AND TRADEMARK OFFICE
CERTIFICATE OF CORRECTION

PATENT NO. : 5,377,299
DATED : December 27, 1994
INVENTOR(S) : James H. Anson and William E. Midden It is certified that error appears in the above-indentified patent and that said Letters Patent is hereby corrected as shown below:

Column 2, Lines 67-68 "desirable provide" should read
—desirable to provide —

Column 8, Line 61 "a fuse 180 fuse 180" should read
—a fuse 180 —

Signed and Sealed this

Eighteenth Day of April, 1995

*Attest:*

BRUCE LEHMAN

*Attesting Officer*  *Commissioner of Patents and Trademarks*